United States Patent
Regan

(10) Patent No.: US 9,210,560 B2
(45) Date of Patent: Dec. 8, 2015

(54) SYSTEMS AND METHODS FOR A CELLULAR ENABLED CONTENT PLAYBACK DEVICE

(71) Applicant: RF Venue, Inc., Ashland, MA (US)

(72) Inventor: Christopher John Regan, Somerville, MA (US)

(73) Assignee: RF Venue, Inc., Ashland, MA (US)

( * ) Notice: Subject to any disclaimer, the term of this patent is extended or adjusted under 35 U.S.C. 154(b) by 62 days.

(21) Appl. No.: 13/832,427

(22) Filed: Mar. 15, 2013

(65) Prior Publication Data

US 2014/0274015 A1 Sep. 18, 2014

(51) Int. Cl.
*H04M 3/00* (2006.01)
*H04W 4/20* (2009.01)
*H04L 29/06* (2006.01)
*H04N 5/00* (2011.01)
*H04N 21/41* (2011.01)
*H04N 21/45* (2011.01)
*H04M 1/725* (2006.01)
*H04W 4/04* (2009.01)

(52) U.S. Cl.
CPC .............. *H04W 4/206* (2013.01); *H04L 65/00* (2013.01); *H04M 1/72525* (2013.01); *H04M 1/72558* (2013.01); *H04N 5/00* (2013.01); *H04N 21/4126* (2013.01); *H04N 21/4524* (2013.01); *H04W 4/043* (2013.01)

(58) Field of Classification Search
CPC ...... H04W 4/206; H04W 4/043; H04L 65/00; H04M 1/72525; H04M 1/72558; H04N 5/00; H04N 21/4126; H04N 21/4524
USPC ....... 455/418; 380/277; 726/27; 340/5.1, 506
See application file for complete search history.

(56) References Cited

U.S. PATENT DOCUMENTS 8,064,603 B2 * 11/2011 Sato et al. ................. 380/277
2011/0254681 A1 * 10/2011 Perkinson et al. ........... 340/506

* cited by examiner

*Primary Examiner* — Amancio Gonzalez
(74) *Attorney, Agent, or Firm* — Wilmer Cutler Pickering Hale and Dorr LLP

(57) ABSTRACT

Systems and methods are provided for a cellular enabled content playback device. A storage device is configured to store content for display on a display device. A cellular modem in communication with the storage device is configured to receive the content from a remote device over a cellular network. An embedded media player in communication with the storage device is configured to display at least a portion of the stored content on the display device.

7 Claims, 5 Drawing Sheets

SYSTEMS AND METHODS FOR A CELLULAR ENABLED CONTENT PLAYBACK DEVICE

TECHNICAL FIELD

Embodiments of the invention generally relate to a cellular enabled content playback device.

BACKGROUND

Conventional media players for digital signage often play content delivered via hardwired Local Area Network (LAN) connected media servers or remote servers located offsite. These players usually require physical connection to the LAN via ethernet cable or over wireless LAN. Remote servers typically connect via private networks or public internet links to stream remote-hosted content. Cellular media playback devices can stream remote content, but it is often at a higher cost than LAN or WLAN methods due to higher data charges for network access. Conventional media players also play content stored on flash memory connected directly to displays or hardwired media players via dedicated card inputs, which must be re-loaded and changed physically at each display or player. The expansion of digital signage puts a strain on corporate information technology systems and is costly to install, maintain, and re-configure once built out. Optimum display positions and actual viewer traffic information are difficult to determine, particularly in dynamic floor layouts such as conventions, retail stores, and hotels. Conventional foot traffic measurement systems, security cameras, and motion detectors are unable to accurately measure viewing times for displays which frequently change locations and content.

SUMMARY

In accordance with the embodiments of the present invention, systems, methods, and non-transitory computer-readable media are provided for a cellular enabled sensing device with integrated media content playback function. Content such as display advertising, digital signage, artwork, and/or the like can be uploaded via any internet enabled device to a remote server, which distributes content via cellular network to the local playback device. Sensor data can be gathered at the location of playback and can include, for example, foot traffic, viewing times, viewer input, and other analytics for location and content optimization. The foot traffic and/or viewing times can be calculated (or collected) by foot traffic measurement systems, security cameras, and motion detectors associated with the cellular enabled sensing device. The collected sensor data can be uploaded to remote server (e.g., via the same ad hoc cellular network). Ad hoc cellular data connections can eliminate local area network configuration, bandwidth congestion, and/or physical installation of a storage medium.

The embodiments of the present invention include an apparatus for cellular enabled content playback. The apparatus includes a storage device configured to store content for display on a display device. The apparatus further includes a cellular modem in communication with the storage device configured to receive the content from a remote device over a cellular network. The apparatus further includes an embedded media player in communication with the storage device configured to display at least a portion of the stored content on the display device.

The embodiments of the present invention include a computerized method for cellular enabled content playback. The method includes receiving, by a cellular modem in a computing device, content for display on a display device of the computing device over a cellular network. The method includes storing, by the computing device, the content in a storage device in communication with the cellular modem. The method includes displaying, by an embedded media player in the computing device, at least a portion of the stored content on the display device.

The embodiments of the present invention include a computerized method for managing cellular enabled content playback. The method includes receiving, by a computing device, from each of one or more remote embedded media players via a cellular network: global positioning system (GPS) data, data indicative of content stored by the remote embedded media player, and sensor data collected by an embedded sensor, a remote sensor, or both, in communication with the remote embedded media player. The method includes generating, by the computing device, a map based on the GPS data that indicates a position of each of the one or more remote embedded media players in the map. The method includes displaying the map, and for a first remote embedded media player from the one or more remote embedded media players, the data indicative of the content stored on the first remote embedded media player, and the sensor data for the first remote embedded media player.

The techniques disclosed herein can upload content to the cellular enabled content playback device via cellular network, allowing the content to be easily changed and/or updated without physical access to the cellular enabled content playback device. Therefore, once installed, the cellular enabled content playback device can allow for ease of maintenance and re-configuration. Further, the cellular enabled content playback device can collect various statistics (e.g., foot traffic, viewing times, etc.) that can be used to determine optimum display positions and actual viewer traffic information (e.g., even for dynamic floor layouts such as conventions, retail stores, and hotels).

These and other capabilities of the embodiments of the present invention will be more fully understood after a review of the following figures, detailed description, and claims. It is to be understood that the phraseology and terminology employed herein are for the purpose of description and should not be regarded as limiting.

BRIEF DESCRIPTION OF THE DRAWINGS

Various objectives, features, and advantages of the embodiments of the present invention can be more fully appreciated with reference to the following detailed description of the disclosed subject matter when considered in connection with the following drawings, in which like reference numerals identify like elements.

DETAILED DESCRIPTION

In the following description, numerous specific details are set forth regarding the systems and methods of the embodiments of the present invention and the environment in which such systems and methods may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid unnecessary complication of the disclosed subject matter. In addition, it will be understood that the embodiments provided below are exemplary, and that it is contemplated that there are other systems and methods that are within the scope of the embodiments of the present invention.

The techniques described herein include cellular network enabled sensors with an integrated media playback function remotely controlled by a web application interface. Ad hoc cellular network connections download media content to a local storage drive on the player. Sensor data such as nearby foot traffic, approximate viewing times, or input data (e.g., name, telephone, email, and/or other contact information) is uploaded to a remote server via the same ad hoc cellular network for analysis by novice users. A web interface displays a player content tracklist alongside device status, location, and sensor data. Sensor data may be processed with various analytical controls such as time, location, and content file for content and location optimization. A web-based content creation tool is in embodiments of the present invention web application to facilitate short form content creation for quick distribution to one or more playback devices. The systems and methods of the embodiments of the present invention further include an individual phone number and email address for content distribution via SMS or email.

Figure 1:
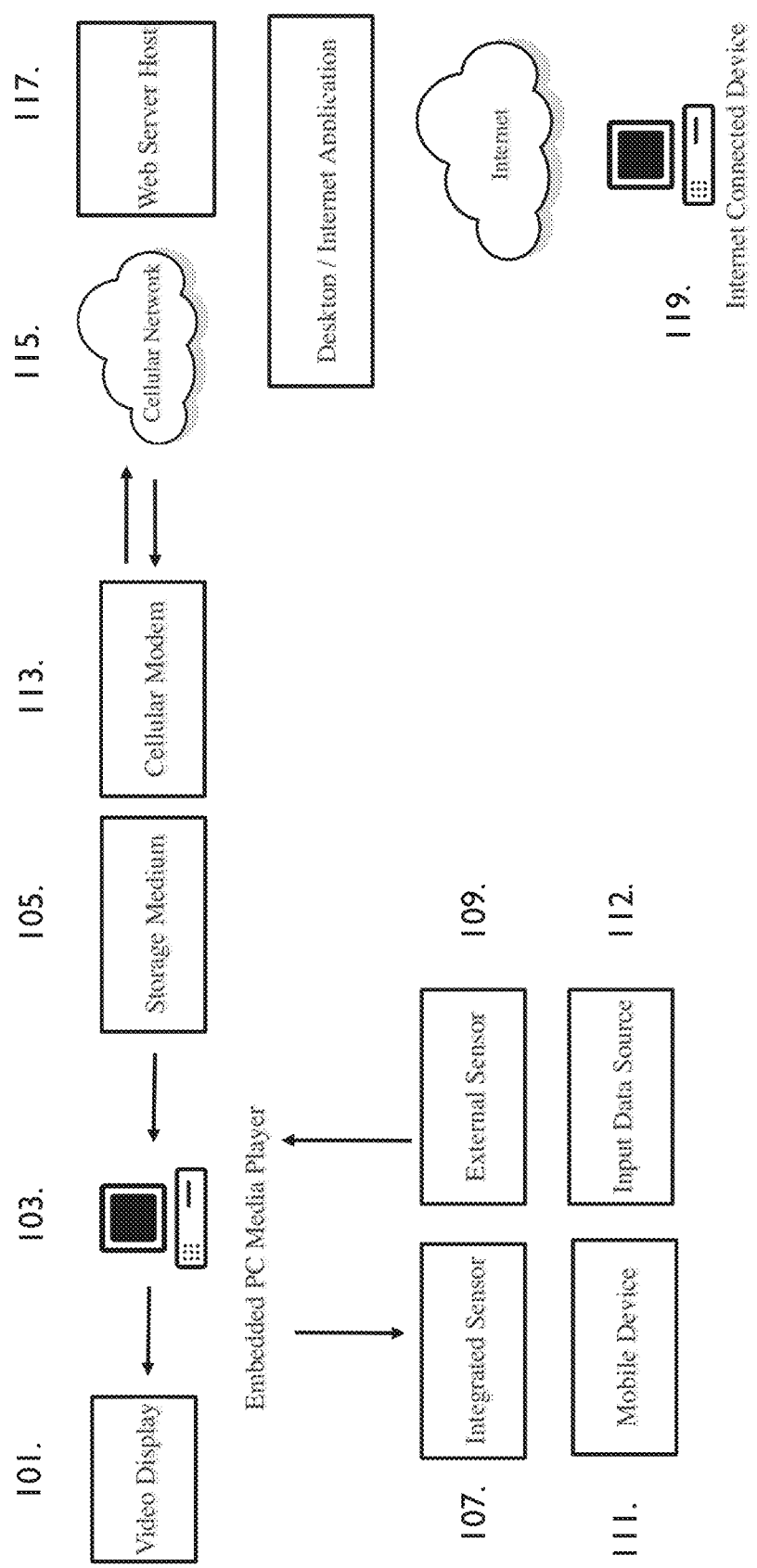
FIG. 1 is an exemplary diagram of a cellular enabled content playback device, in accordance with embodiments of the present invention.

FIG. 1 is an exemplary diagram of a cellular enabled content playback device, in accordance with embodiments of the present invention. Storage medium 105 hosts content, which is played back by embedded PC media player 103 for display on video display 101. The embedded PC media player 103 can be, for example, an Android or LINUX based computational system with processing hardware, memory, and dedicated software application. Storage medium 105 can be any type of data storage device including, for example, flash memory or a hard drive. Content is generated or uploaded by user via internet connected device 119 using application web server host 117. Web server host 117 connects via ad hoc cellular data connection 115 to cellular modem 113 to download content to storage medium 105. Externally connected sensor 109 or integrated sensor 107 receives input data from input data source 112 or mobile device 111. The input data source 112 can be, for example, user input contact information or bar code data such as a product code, a coupon code, an identification badge, and/or the like. Externally connected sensor 109 can include, for example, RFID tag readers, bar code readers, user input devices such as magnetic card readers, keypads and/or the like. Integrated sensor 107 can include, for example, an infrared motion sensor, a video or still camera for security, an optical scanner for user input, and/or the like. Input data from sensors 107 or 109 are sent via cellular modem 113 over cellular network 115 to web server host 117 for interpretation (e.g., such as automated interpretation and/or user interpretation using internet connected device 119).

Figure 2:
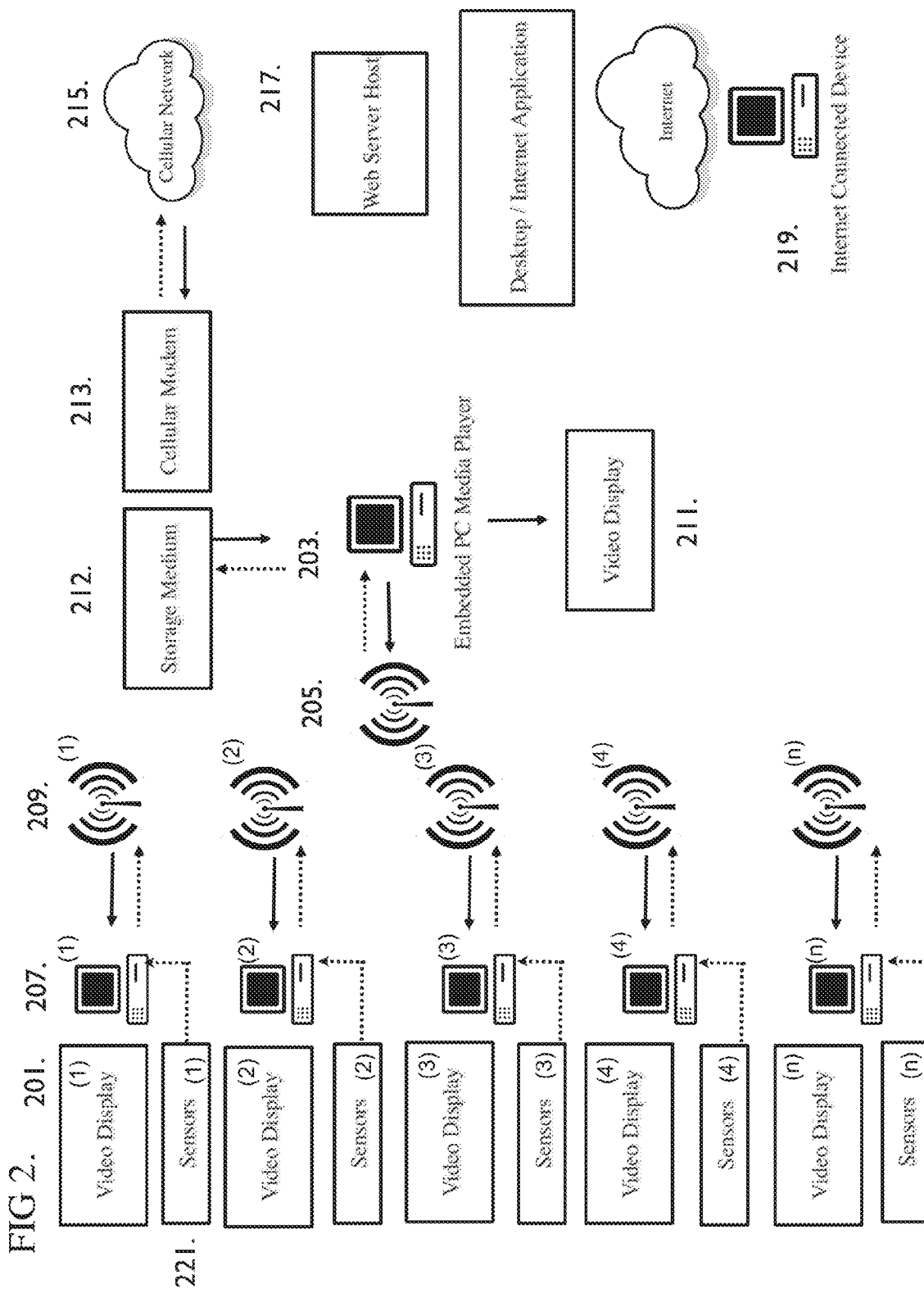
FIG. 2 is an exemplary diagram of a cellular enabled content playback device in a multi-player sensor and content distribution network, in accordance with embodiments of the present invention.

FIG. 2 is an exemplary diagram of a cellular enabled content playback device in a multi-player sensor and content distribution network, in accordance with embodiments of the present invention. Embedded PC media player 203 plays back content from storage medium 212 on locally connected video display 211 and acts as a headend in a network of multiple embedded pc media players 207(1) . . . 207(n) (collectively 207) (e.g., by distributing content to the multiple embedded pc media players 207). PC media players 207 store content on local storage media similar to 212 and play back content on video displays 201(1) . . . 201(n) (collectively 201). Embedded PC media player 203 transmits content via wireless local area network device 205 to wireless local area network device 209(1) . . . 209(n)(collectively 209). For example, the local area network device 205 can transmit content via common unlicensed 2.4 GHz network, UHF white space network, 900 MHz band or 5.8 GHz band network protocol, and/or the like. The wireless local area network device 209 connects to embedded PC media players 207. Sensors 221(1) . . . 221(n) (collectively 221) connect to embedded PC media players 207 and return data through wireless local area network device 209 to headend embedded PC media player 203, which can in turn transmit data via cellular modem 213.

Figure 3:
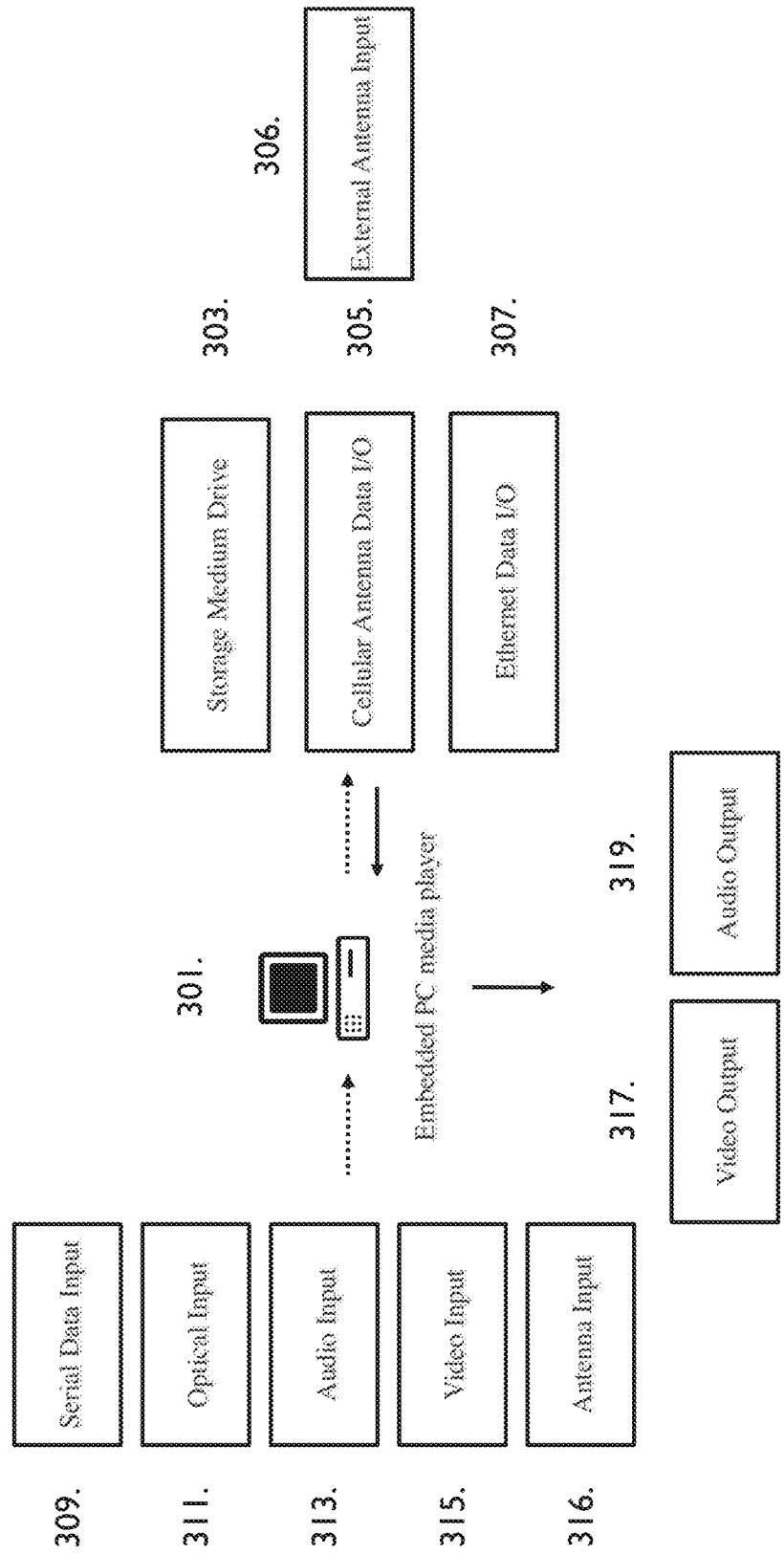
FIG. 3 is an exemplary diagram showing inputs and outputs for a cellular enabled content playback device, in accordance with embodiments of the present invention.

FIG. 3 is an exemplary diagram showing inputs and outputs for a cellular enabled content playback device, in accordance with embodiments of the present invention. The embedded PC media player 301 has a series of inputs and outputs to enable content and sensor data distribution. Storage medium drive 303 can be, for example, common flash memory or removable media. Cellular antenna data I/O port 305 can be, for example, a bus interface for a cellular modem, which may incorporate an external antenna port 306 for increased signal strength in weak reception facilities or rural areas. Ethernet data I/O 307, for example, a common category 5 ethernet cable connection. The Ethernet data I/O 307 can be used to receive and transmit data (e.g., to receive content to store on the storage medium drive 303, or to transmit sensor data. Video output 317 and audio output 319, for example, common analog or digital configurations to accommodate both analog Radio Corporation of America (RCA) connectors, Separate Video (S-Video) connectors, coaxial type connections, and/or the like, as well as digital High-Definition Multiple Interface (HDMI) or optical input enabled displays. The RCA, S-Video, coaxial, and/or HDMI-type video outputs can be used to connect the cellular enabled content playback device to the video input of various types of displays, including, for example, flat screen televisions, computer monitors, digital signs, projection equipment, and/or the like. Common video cable assemblies can be used to interface the content player with displays. The systems and methods of the embodiments of the present invention include serial data port 309 which can be, for example, a keypad or other input device. Serial data port 309 can be used to receive data from an external sensor (e.g., external sensor 109 of FIG. 1). Optical input 311 can be, for example, for infrared motion sensing or barcode reading. Audio and video inputs 313 and 315 can be, for example, microphones, cameras, and/or other audio-visual and photographic systems. Antenna input 316 can be, for example, a common coaxial interface to receive nearfield communication signals. Serial data port 309, optical input 311, audio and video inputs 313 and 315, antenna input 316 can be used in any combination to receive data from one or more external sensors (e.g., external sensor 109 of FIG. 1).

Figure 4:
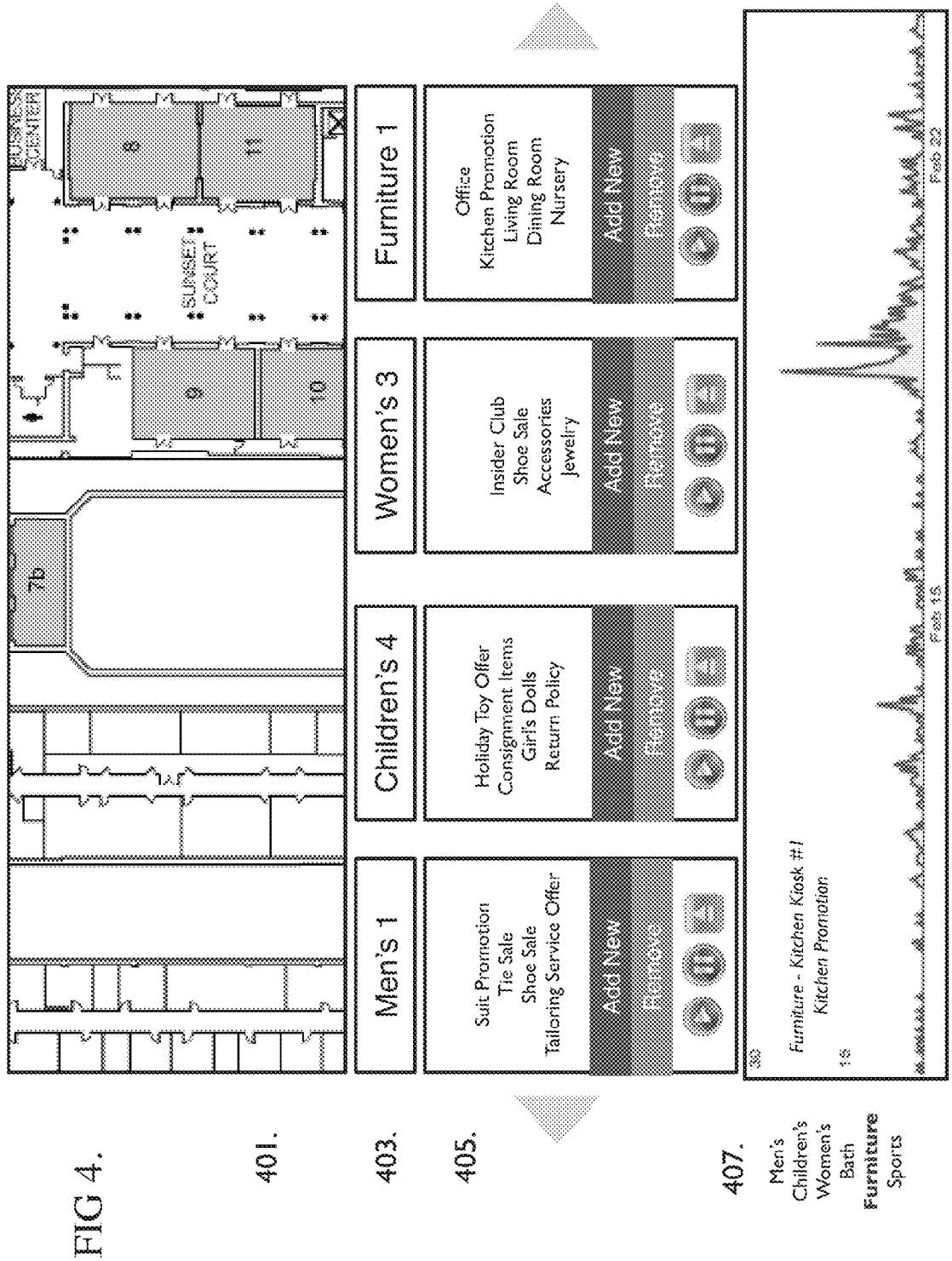
FIG. 4 is a diagram showing an exemplary configuration of the web application interface, in accordance with embodiments of the present invention.

FIG. 4 is a diagram showing an exemplary configuration of the web application interface, in accordance with embodiments of the present invention. According to this exemplary embodiment, interface 401 can be a user customized floor plan showing display locations within a facility or a wider scale geographic map (e.g., based on device GPS locations). Selectable menu 403 allows selection of playback devices (e.g., as shown, Men's Kiosk #1 (Men's 1), Children's Kiosk #4 (Children's 4), Women's Kiosk #3 (Women's 3), and Furniture Kiosk #1 (Furniture 1)), and the locally hosted content for the selected playback device is listed in user interface display 405. The playback devices in the selectable menu 403 can be named such that they can also be identified on the interface 401 (e.g., using numbers and/or letters). Display 405 can include user interface buttons to control the order of content playback and/or to add or remove content (e.g., play, pause, etc.). Display 407 may show sensor input data such as foot traffic, length of viewing session, contact information gathered, and/or other actionable information regarding user optimization of content or display location.

For example, for foot traffic data, display 407 may be a textual display ranking highest viewed display locations in a retail store. As another example, display 407 may be a graphical display showing the number of times a display is viewed (e.g., by the hour or from historical logs). For example, display 407 as shown in FIG. 4 includes a selectable list for various cellular enabled display devices, including "Men's," "Children's," "Women's," "Bath," "Furniture," and "Sports." The device "Furniture" is selected, and therefore the display 407 shows historical viewing information for the "Furniture—Kitchen Kiosk #1" device, for the "Kitchen Promotion" content. Such information can be used to determine optimum display positions and actual viewer traffic information. As another example, for contact information the display 407 may include a tabulated text list of input data such as name, telephone, email, and/or other contact information.

Figure 5:
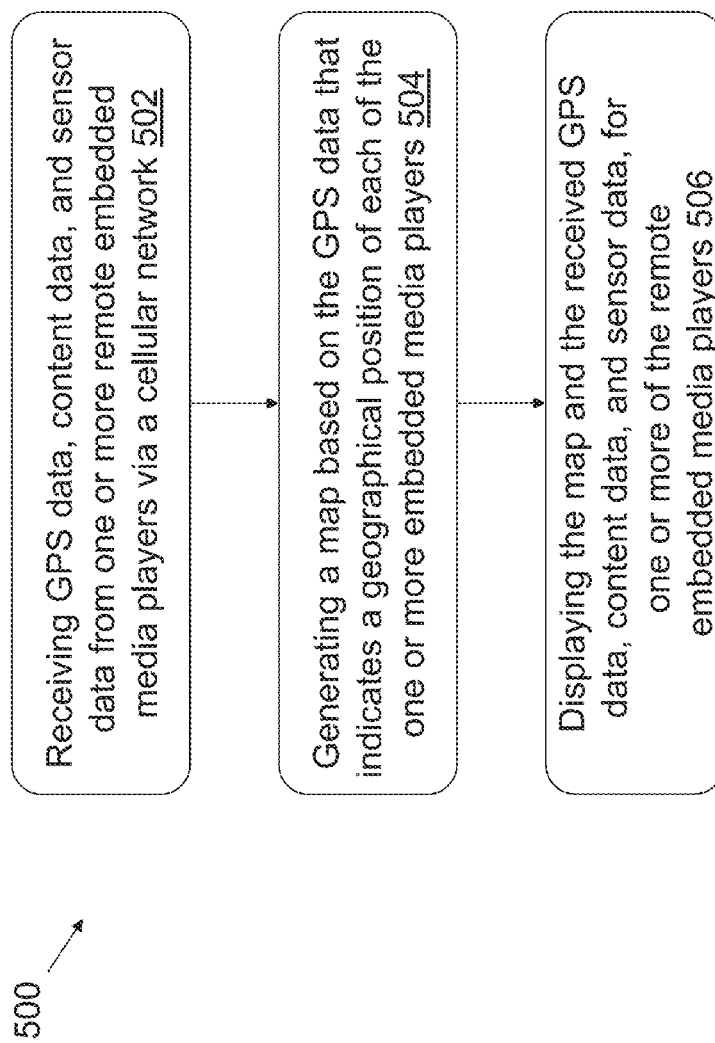
FIG. 5 is an exemplary computerized method for managing cellular enabled content playback devices, in accordance with embodiments of the present invention.

FIG. 5 is an exemplary computerized method 500 for managing cellular enabled content playback devices, in accordance with embodiments of the present invention. Referring to FIG. 1, at step 502, the web server host 117 receives data from each of one or more remote embedded media players 103 via cellular network 115 (while only one remote embedded media player 103 is shown in FIG. 1, any number of remote embedded media players 103 can be in communication with the web server host 117). The data includes global positioning system (GPS) data, data indicative of content stored by the remote embedded media players (e.g., which advertisements, videos, artwork, etc. is stored for display), and sensor data collected by a sensor (e.g., an embedded sensor, a remote sensor, etc.).

At step 504, the web server host 117 generates a map based on the GPS data that indicates a position of each of the one or more remote embedded media players in the map. The map can be, for example, a map from a publicly available mapping program, or a custom map (e.g., loaded in to the web server host). At step 506, the web server host 117 generates a web page that includes the map. The web page also includes, for one or more remote embedded media players, the data indicative of content stored on the remote embedded media player, and the sensor data for the remote embedded media player. For example, the data indicative of the content is displayed in display 405, and the sensor data can be displayed in display 407. The web page can be requested and viewed by, for example, the internet connected device 119.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of non volatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The embodiments of the present invention are capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the embodiments of the present invention. It is important, therefore, that the claims be regarded as including such equivalent constructions insofar as they do not depart from the spirit and scope of the disclosed subject matter.

Although the embodiments of the present invention have been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

What is claimed is:

1. A computerized method for cellular enabled content playback, the method comprising:
   receiving, by a cellular modem in a computing device, content for display on a display device of the computing device over a cellular network;
   storing, by the computing device, the content in a storage device in communication with the cellular modem;
   displaying, by an embedded media player in the computing device, at least a portion of the stored content on the display device;
   generating sensor data, receiving sensor data from an external sensor, or both, wherein the sensor data includes foot traffic near the computing device, approximate viewing times of the at least a portion of the stored content on the display device, data input to the computing device, or any combination thereof, for optimizing content displayed by the computing device, a display location of the computing device, or both, by the remote device; and
   transmitting, by the cellular modem in the computing device, the sensor data to a remote device over the cellular network.

2. The method of claim 1 further comprising transmitting video data and audio data, respectively, to the display device.

3. The method of claim 1 further comprising transmitting content from the stored content to a common wireless network shared by a plurality of second embedded media players so that the plurality of second embedded media players can store the content on an associated storage device.

4. A computerized method for managing cellular enabled content playback, the method comprising:
   receiving, by a computing device, from each of one or more remote embedded media players via a cellular network: global positioning system (GPS) data, data indicative of content stored by the remote embedded media player, and sensor data collected by an embedded sensor, a remote sensor, or both, in communication with the remote embedded media player;
   generating, by the computing device, a map based on the GPS data that indicates a position of each of the one or more remote embedded media players in the map; and
   displaying: the map, and for a first remote embedded media player from the one or more remote embedded media players, the data indicative of the content stored on the first remote embedded media player, and the sensor data for the first remote embedded media player.

5. The method of claim 4 further comprising:
   displaying a selectable menu comprising a set of playback devices; and
   receiving data indicative of a selection of a playback device in the set of playback devices; and
   displaying locally hosted content for the selected playback device in a user interface portion.

6. The method of claim 5 further comprising:
   displaying a set of user interface buttons to control content playback on a playback device, to add or remove content to the playback device, or any combination thereof;
   receiving data indicative of a selection of a user interface button from the set of user interface buttons; and
   managing content on the playback device based on the received data.

7. The method of claim 5 further comprising:
   displaying sensor input data comprising foot traffic for a playback device, length of viewing session of content of the playback device, contact information gathered from the playback device, or any combination thereof; and
   optimizing content displayed by the computing device, a display location of the computing device, or both, based on the sensor input data.

* * * * *